United States Patent [19]
Brown, Jr.

[11] Patent Number: 5,686,154
[45] Date of Patent: Nov. 11, 1997

[54] THREE-DIMENSIONAL TOPOGRAPHICAL MODEL

[76] Inventor: James Seay Brown, Jr., 408 Woodland Dr., Birmingham, Ala. 35209

[21] Appl. No.: 599,576

[22] Filed: Feb. 9, 1996

[51] Int. Cl.[6] ............................................. G09B 25/06
[52] U.S. Cl. ............................ 428/15; 428/33; 428/542.2; 434/152
[58] Field of Search ..................... 428/15, 33, 542.2; 434/152

[56] References Cited

U.S. PATENT DOCUMENTS

| | | | |
|---|---|---|---|
| 2,127,546 | 8/1938 | Whittier | 434/152 |
| 2,138,024 | 11/1938 | Cheesman | 434/150 |
| 2,185,689 | 1/1940 | Jensen | 434/152 |
| 2,189,592 | 2/1940 | Perera | 428/78 X |
| 2,687,033 | 8/1954 | Snyder | 428/15 X |
| 2,887,791 | 5/1959 | Garbutt | 434/152 |
| 3,137,080 | 6/1964 | Zang | 434/152 |
| 3,742,620 | 7/1973 | Knoll | 434/152 |
| 3,800,442 | 4/1974 | Petrocelli | 428/542.2 X |
| 5,015,312 | 5/1991 | Kinzie | 156/63 |
| 5,330,804 | 7/1994 | Allison et al. | 428/15 |

*Primary Examiner*—Henry F. Epstein
*Attorney, Agent, or Firm*—Veal & Associates

[57] ABSTRACT

An improved three-dimensional topographical model comprised of a plurality of layers having curvilinear apertures therethrough. The layers are stacked upon each other to form a three-dimensional hollow structure. The individual layers are cut from at least two motherboards and each layer is marked with a contour line to indicate the location on which the subsequent layer is stacked. During assembly, the outermost topographical layer of a first motherboard is removed and placed on a support member, thus constituting the first or bottom layer of the model. The outermost topographical layer of the second motherboard is removed and placed on top of the first layer, and subsequent layers are alternately removed from each of any remaining motherboards and stacked so that the margin of each layer overlaps the margin of the previous layer. This process is repeated until all layers are utilized and the model is fully formed. A model having steep inclines will require a greater number of motherboards. During disassembly of the model, the layers are placed back into the relative motherboards from whence they came. This results in relatively flattened motherboards which can be conveniently stored or transported.

17 Claims, 4 Drawing Sheets

THREE-DIMENSIONAL TOPOGRAPHICAL MODEL

FIELD OF THE INVENTION

The present invention relates to topographical models. More particularly, the present invention relates to an improved three-dimensional topographical model for use in education. Still more particularly, the present invention relates to an educational topographical model which can be easily assembled into its three-dimensional form and quickly disassembled into a relatively two-dimensional form for convenient transportation or storage.

BACKGROUND OF THE INVENTION

Topographical models provide a graphic representation of the surface features of a place or region, indicating their relative positions and elevations. These models are very useful tools in the planning and development of buildings, roads, and cities. They also make excellent teaching devices, especially three-dimensional models. Three-dimensional topographical models allow students to get a visual image of structures, regions, mountain ranges and the like. They assist the student in understanding why roads are placed where they are, why cities develop in certain locations, and even how civilizations grow and prosper in various regions. However, a feature of three-dimensional topographical models which can be cumbersome is their bulkiness. In an educational classroom, a large mount of space may be required where multiple models are displayed. Additionally, should the model need to be transported, difficulties may arise in fitting some models through doorways or into vehicles.

As a result, there is a need for a three-dimensional topographical model which can be easily assembled for educational instruction or display, and subsequently disassembled for convenient transportation or storage. In addition, an interactive three-dimensional model, which is constructed by the student rather than presented in a pre-assembled form, would make a valuable teaching device.

SUMMARY OF THE PRESENT INVENTION

It is the object of the present invention to provide a topographical model which is three-dimensional.

It is another object of the present invention to provide a three-dimensional topographical model which is a useful educational tool.

It is still another object of the present invention to provide a three-dimensional topographical model which can be easily assembled into its three-dimensional form and disassembled into a relatively two-dimensional form for convenient transportation or storage.

These and other objects of the present invention are accomplished through the use of an improved three-dimensional topographical model. The model is comprised of a plurality of layers having curvilinear apertures therethrough. The layers are stacked upon each other to form a three-dimensional hollow structure. The individual layers are cut from at least two motherboards and each layer is marked with a contour line to indicate the location on which the subsequent layer is stacked. During assembly, the outermost topographical layer of the first motherboard is removed and placed on a support member, thus constituting the first or bottom layer of the model. The outermost topographical layer of the second motherboard is removed and placed on top of the first layer, and this process repeated for each remaining motherboard. The sequence returns to the first motherboard, and the next outer topographical layer is removed and placed atop the growing model. This process is repeated through the motherboards, in rotation, until the model is completed. A model having steep inclines will require a greater number of motherboards. For extremely steep models, it may be preferable to use pre-formed peaks rather than a greater number of motherboards. During disassembly of the model, the layers are placed back into the relative motherboards from whence they came. This results in relatively flattened motherboards which can be conveniently stored or transported.

These and other objects and advantages of the invention will become apparent from the following detailed description of the preferred embodiment of the invention.

BRIEF DESCRIPTION OF THE DRAWINGS

A three-dimensional topographical model embodying features of my invention is described in the accompanying drawings which form a portion of this disclosure and wherein.

DETAILED DESCRIPTION OF THE PREFERRED EMBODIMENT

Figure 1:
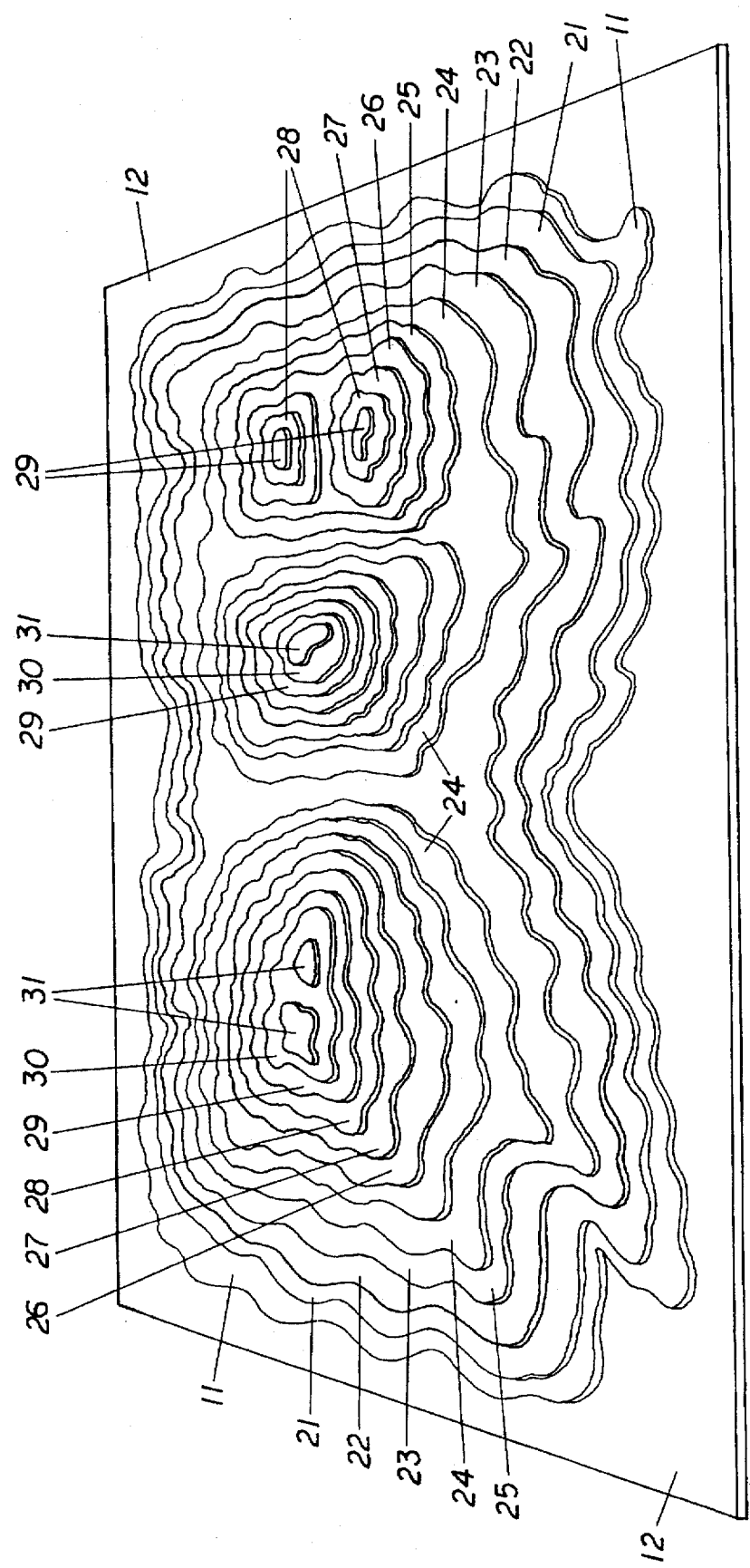
FIG. 1 is a perspective view of the assembled model.
Figure 2:
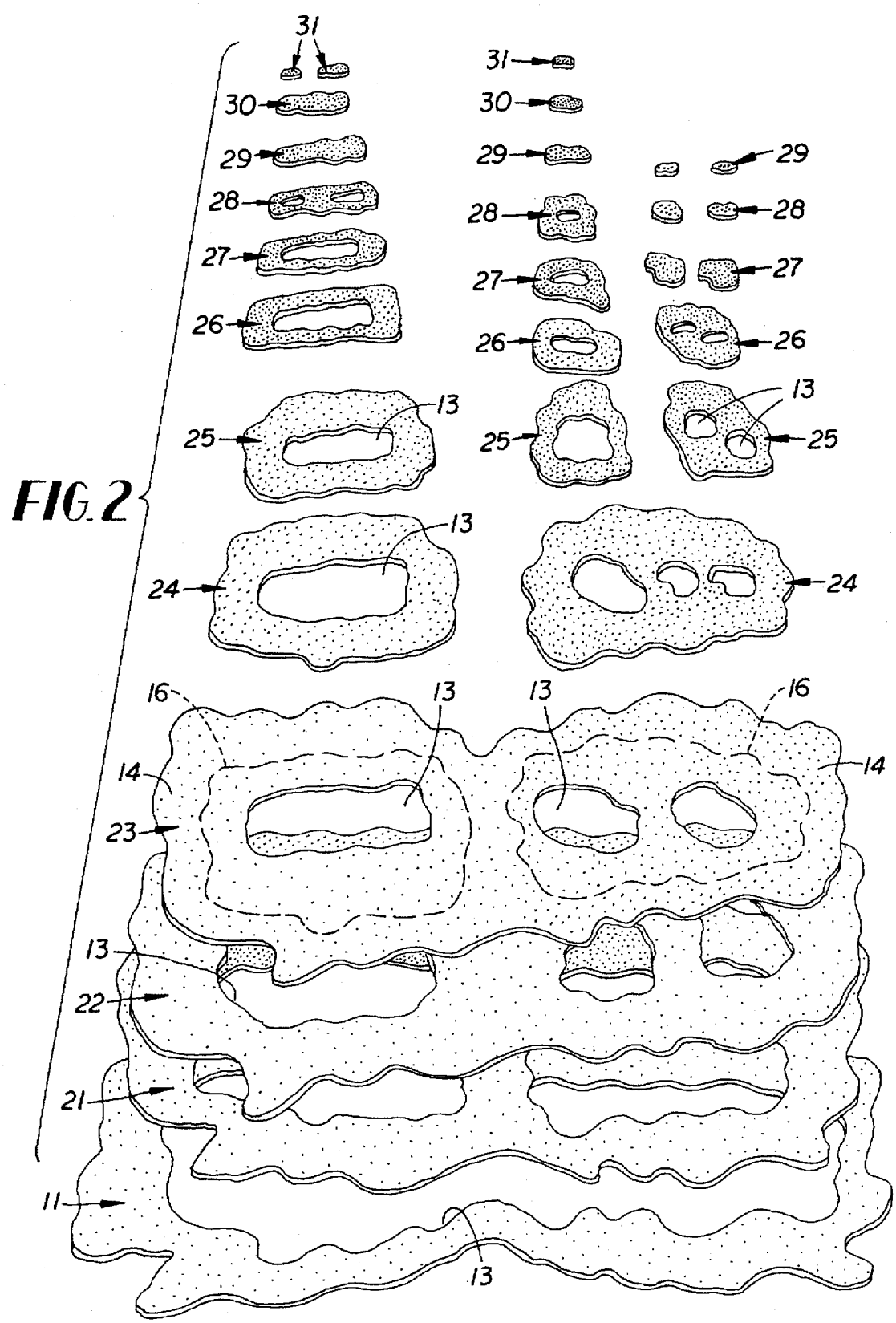
FIG. 2 is an exploded view of the model of FIG. 1.
Figure 4:
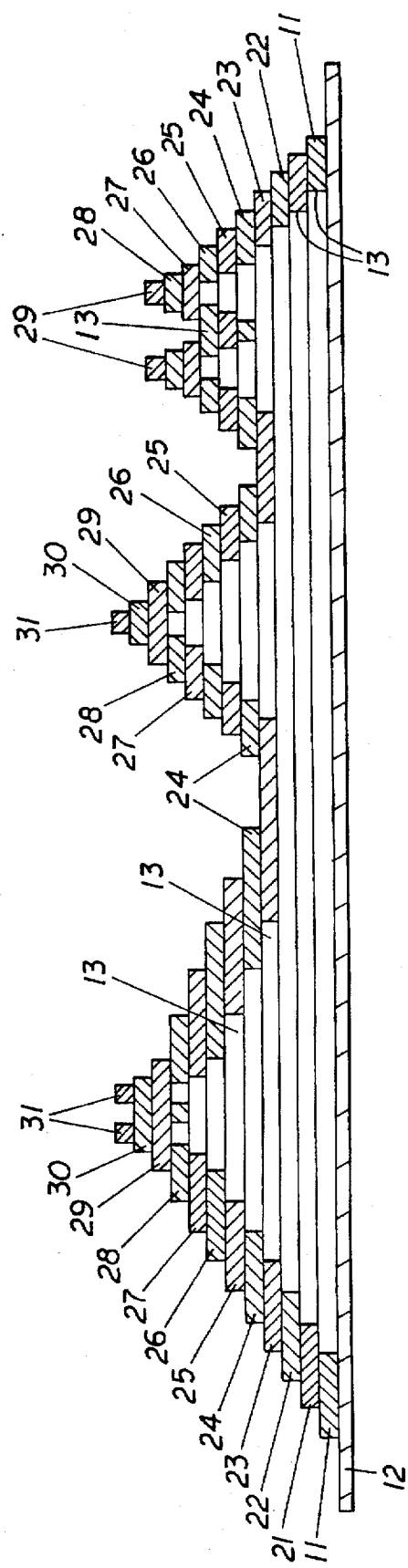
FIG. 4 is a sectional view of the assembled model.

A more complete understanding of the invention may be obtained by reference to the accompanying drawings wherein the invention, illustrated in the form of an island, is a three-dimensional topographical model comprising a plurality of layers, the layers representing the contour lines from a contour map. A contour map is a map showing elevations and surface configuration by means of contour lines. A contour line is a line on a map that joins points of equal elevation. Each layer represents a uniform elevational increment, typically 1000 feet per layer. The layers are usually color coated to represent increasing elevational ranges and to assist in assembly, however, this is not essential to the functioning of the invention. The base layer 11 is placed on a support member 12, which can be a table, desk top, or the like. Subsequent layers are stacked superjacently on preceding layers until the model is fully assembled to form a self-supporting three-dimensional structure. The majority of layers have apertures 13 therethrough, forming margins 14 and resulting in a hollow model when assembled, best illustrated in FIGS. 2 and 4. The apertures through the layers have the effect of reducing the weight of the assembled model and assisting in storage or transportation of the disassembled model, which will be discussed shortly. To assist in assembly, each layer can have indices, usually in the form of contour lines 16, printed on the upper surface indicating the location of placement of the outermost edges of the subsequent superjacent layer, illustrated in FIG. 2. Additionally, the indices on each layer, or the area within the indices, can be colored to match the color of the next layer to be stacked. As the layers are stacked upon each other, the margins 14 overlap to give a staggered cross-sectional appearance as illustrated in FIG. 4.

The individual layers of the model are cut from at least two motherboards. For purposes of this disclosure, a motherboard is simply a sheet of material from which the layers have been cut. The layers are cut from the motherboards by lasers, knives, pre-formed dies, or any other manner commonly known in the art. Each motherboard is typically rectangular in shape and substantially planar, usually between 0.1 to 3.0 centimeters thick, although this can vary. Once the individual layers are cut and removed from the motherboard, the remaining unused material can be placed onto a rigid surface, such as cardboard, to serve as a template to which the individual layers can be returned when the model is disassembled. The motherboard is typically comprised of a flexible foam plastic or rubber, but can also be made of woods, hard plastics, ceramics or the like. The material is preferably lightweight but should be sturdy enough to support the stacked layers. A model having steep inclines will require a greater number of motherboards. For extremely steep models, it may be more convenient to use pre-formed peaks rather than to use a large number of motherboards.

Figure 3:
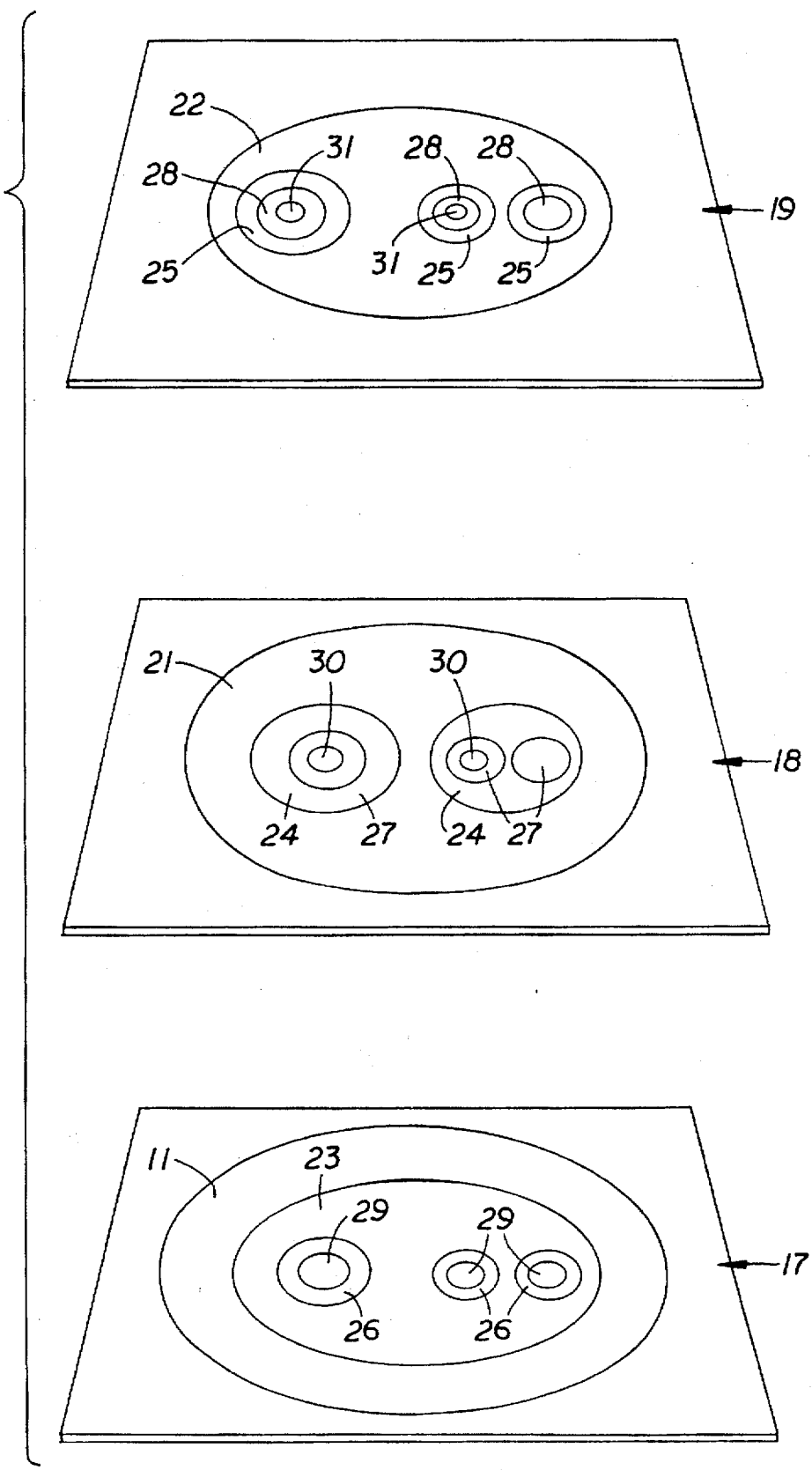
FIG. 3 illustrates the motherboards and the relationship of the relative layers thereto.

As disclosed above, the present invention requires at least two motherboards to function as intended. For purposes of illustration, FIG. 3 shows three motherboards and twelve individual layers cut from them. From a three-dimensional perspective, each layer represents a contour line from a map with a uniform elevational change of 1000 feet per layer. The support member 12 typically represents sea level. Thus, the base layer 11 represents 1000 feet above sea level, the second layer 21 represents 2000 feet above sea level, and so on, with the last layer 31 representing 12,000 feet above sea level. From a two-dimensional perspective, it is the outer edge of a layer which represents the contour line for that layer. Thus, the outer edge of layer 11 represents 1000 feet above sea level, the outer edge of the second layer 21 represents 2000 feet above sea level, and so on, with the outer edge of the last layer representing 12,000 feet above sea level. However, the inner edge of the margin 14 of a particular layer is not equivalent to the contour line of the subsequent layer to be superjacently stacked, but rather is equivalent to the contour line of the next adjacent layer from the same motherboard. For example, in a model utilizing three motherboards, the inner edge of the margin of each layer is equivalent to (s+3t), where s is equal to the elevational equivalent of that particular layer and t is equal to the uniform unit of elevation. Thus, for the present illustration utilizing three motherboards with a uniform unit of elevation of 1000 feet per layer, the inner edge of layer 11 would be equivalent to 4000 feet, the inner edge of layer 21 would be equivalent to 5000 feet, and so on. The innermost layers of each motherboard, which will become the uppermost layers of the model, do not have apertures and thus no inner edges.

During assembly, the first layer 11 is removed from the first motherboard 17 and placed on a support member 12. The second layer 21 is removed from the second motherboard 18 and stacked onto the first layer 11 so that the margin overlaps the margin of the first layer. The third layer 22 is removed from the third motherboard 19 and stacked onto the second layer 21 so that the margin overlaps the margin of the second layer; and the fourth layer 23 is removed from the first motherboard 17 and stacked onto the third layer 22 so that the margin overlaps the margin of the third layer. Subsequent layers are alternately removed from each motherboard, in turn, and stacked so that the margin of each layer overlaps the margin of the previous layer. This process is repeated until layers 24 through 31 are stacked and the model is fully formed. The overlapping stacked layers form a hollow three-dimensional model where the spaces formed by the apertures are not detectable once the model is fully assembled. The full benefit of this feature is seen when the model is disassembled. During disassembly, the layers are placed back into the template with the appropriate motherboard from whence the relative layers came such that the layers are in substantially planar interstitial engagement. The result is that the model can be stored in a space having a storage height equal to the number of motherboards times their individual thickness. The saving in storage height over a permanently assembled three-dimensional model is thus equal to [(1-y/x) multiplied by z], where x is equal to the number of layers, y is equal to the number of motherboards, and z is equal to the total height of the assembled model. Thus, in the present illustration with three motherboards and twelve layers, the total height of the model will be reduced by 75% when stored in the template. Accordingly, an increased number of layers per motherboard yields an increased saving in storage space relative to the height of the assembled model. This allows the model to be broken down into two or more relatively flattened motherboards which can be stored in a relatively small space or transported without the problems frequently encountered in transporting a bulky assembled model. Numbers or other designations, i.e. color coding, can be placed on the underside of each layer and additionally on the template to assist in replacement of the layers into the appropriate motherboard.

It is to be understood that the form of the invention shown is a preferred embodiment thereof and that various changes and modifications may be made therein without departing from the spirit of the invention or scope as defined in the following claims.

Having set forth the nature of the invention, what is claimed is:

1. An improved topographical model comprising a plurality of uniform layers wherein said layers represent elevational increments of a geographic structure, said layers having curvilinear apertures therethrough such that said layers may be stacked to form a self-supporting, hollow three-dimensional topographical model which can be subsequently disassembled and stored in a relatively planar form.

2. An improved model as defined in claim 1 wherein said layers are portions from at least two motherboards, each motherboard comprising a substantially equivalent number of layers in planar interstitial engagement.

3. An improved model as defined in claim 2 wherein each of said motherboards has a thickness between 0.1 to 3.0 centimeters when said layers are stored in said motherboards.

4. An improved model as defined in claim 1 wherein each layer has indices formed thereon defining the size and location of a next superjacent layer.

5. An improved model as defined in claim 1 wherein said layers are substantially concentric portions of at least two motherboards.

6. An improved model as defined in claim 1 wherein said layers have a thickness between 0.1 to 3.0 centimeters.

7. An improved topographical model comprising a plurality of color coded layers having curvilinear apertures therethrough, said layers having margins comprised of inner and outer edges, wherein said margins overlap when stacked to form a hollow three-dimensional structure which can be subsequently disassembled and stored in a relatively planar form.

8. An improved topographical model as defined in claim 7 wherein said layers are portions from at least two motherboards.

9. An improved topographical model as defined in claim 8 wherein each of said motherboards has a thickness between 0.1 to 3.0 centimeters when said layers are stored in said motherboards.

10. An improved topographical model as defined in claim 8 wherein said motherboards fit within a single container for storage or transportation.

11. An improved topographical model as defined in claim 8 wherein each of said motherboards fits within its own container for storage or transportation.

12. An improved model as defined in claim 7 wherein each layer has indices formed thereon defining the size and location of a next superjacent layer.

13. A topographical model for use in teaching which can be assembled into a hollow three-dimensional structure and subsequently disassembled and stored in a substantially planar form, comprising in combination:

(a) a first planar member having imprinted thereon a plurality of elevational indices in the form of contour lines, said first planar member being separable into a plurality of segments with each segment having a periphery defined by one of said contour lines such that each segment fits within a larger segment of said first planar member; and (b) a second planar member having imprinted thereon a plurality of complementary elevational indices in the form of contour lines, said second planar member being separable into a plurality of complementary segments with each segment having a periphery defined by one of said complementary contour lines such that the planar dimension of each complementary segment is intermediate the planar dimension of selected adjacent segments of said first planar member.

14. A topographical model as defined in claim 13 wherein said segments and said complementary segments represent elevational increments of a geographic structure, wherein said segments and said complementary segments may be stacked to form a self-supporting, hollow three-dimensional topographical model.

15. A topographical model as defined in claim 14 wherein each segment has formed thereon indices representing the periphery of a superjacently matching complementary segment.

16. A topographical model as defined in claim 13 further comprising in combination a plurality of additional planar members, each of said additional planar members having imprinted thereon a plurality of complementary elevational indices in the form of contour lines, each of said additional planar members being separable into a plurality of complementary segments with each segment having a periphery defined by one of said complementary contour lines such that the planar dimension of each segment is intermediate the planar dimension of selected adjacent segments of other planar members.

17. A topographical model as defined in claim 16 wherein said segments and said complementary segments have formed thereon means for identifying and positioning a superjacent segment.

* * * * *